United States Patent
Schieler et al.

(10) Patent No.: US 11,735,794 B2
(45) Date of Patent: Aug. 22, 2023

(54) METHOD FOR CONNECTING AN ENERGY STORAGE MODULE TO A MODULE SUPPORT, IN PARTICULAR A COOLING ELEMENT

(71) Applicant: AUDI AG, Ingolstadt (DE)

(72) Inventors: Oliver Schieler, Gaimersheim (DE); Martin Simon, Reichertshofen (DE)

(73) Assignee: AUDI AG, Ingolstadt (DE)

( * ) Notice: Subject to any disclaimer, the term of this patent is extended or adjusted under 35 U.S.C. 154(b) by 122 days.

(21) Appl. No.: 17/220,157

(22) Filed: Apr. 1, 2021

(65) Prior Publication Data
US 2021/0328249 A1 Oct. 21, 2021

(30) Foreign Application Priority Data
Apr. 20, 2020 (DE) .................. 102020110641.6

(51) Int. Cl.
| | |
|---|---|
| *H01M 50/262* | (2021.01) |
| *H01M 10/04* | (2006.01) |
| *H01M 10/6554* | (2014.01) |
| *H01M 10/613* | (2014.01) |
| *B60L 50/60* | (2019.01) |

(52) U.S. Cl.
CPC ......... *H01M 50/262* (2021.01); *H01M 10/04* (2013.01); *H01M 10/613* (2015.04); *H01M 10/6554* (2015.04); *B60L 50/66* (2019.02)

(58) Field of Classification Search
CPC ..... B60L 50/66; H01M 10/04; H01M 10/613; H01M 10/625; H01M 10/653; H01M 10/655; H01M 10/6554
See application file for complete search history.

(56) References Cited

U.S. PATENT DOCUMENTS

| | | | |
|---|---|---|---|
| 5,340,258 A | 8/1994 | Simon | |
| 2010/0015512 A1 | 1/2010 | Inoue et al. | |
| 2014/0248523 A1* | 9/2014 | Roh | H01M 50/578 |
| | | | 429/121 |
| 2018/0002873 A1* | 1/2018 | Young, Jr. | E01C 19/42 |
| 2020/0259140 A1* | 8/2020 | Lee | H01M 50/262 |

(Continued)

FOREIGN PATENT DOCUMENTS

| | | |
|---|---|---|
| CN | 103122897 A | 5/2013 |
| DE | 1237981 A1 | 5/1993 |

(Continued)

OTHER PUBLICATIONS

Machine English translation of DE-102016222094-A1 (Year: 2016).*

(Continued)

*Primary Examiner* — Ula C Ruddock
(74) *Attorney, Agent, or Firm* — Maier & Maier, PLLC

(57) ABSTRACT

A method for connecting an energy storage module to a module support, in particular a cooling element, The energy storage module is fastened on the module support by multiple connecting screws, which are each screwed into threaded bores provided on the module support. A gap is provided between the bottom of the energy storage module and the bottom of the module support, into which a thermally-conductive compound is introduced, which is distributed to fill the gap due to a reduction of the gap width when the energy storage module is screwed down.

11 Claims, 3 Drawing Sheets

(56) References Cited

U.S. PATENT DOCUMENTS

Figure 1:
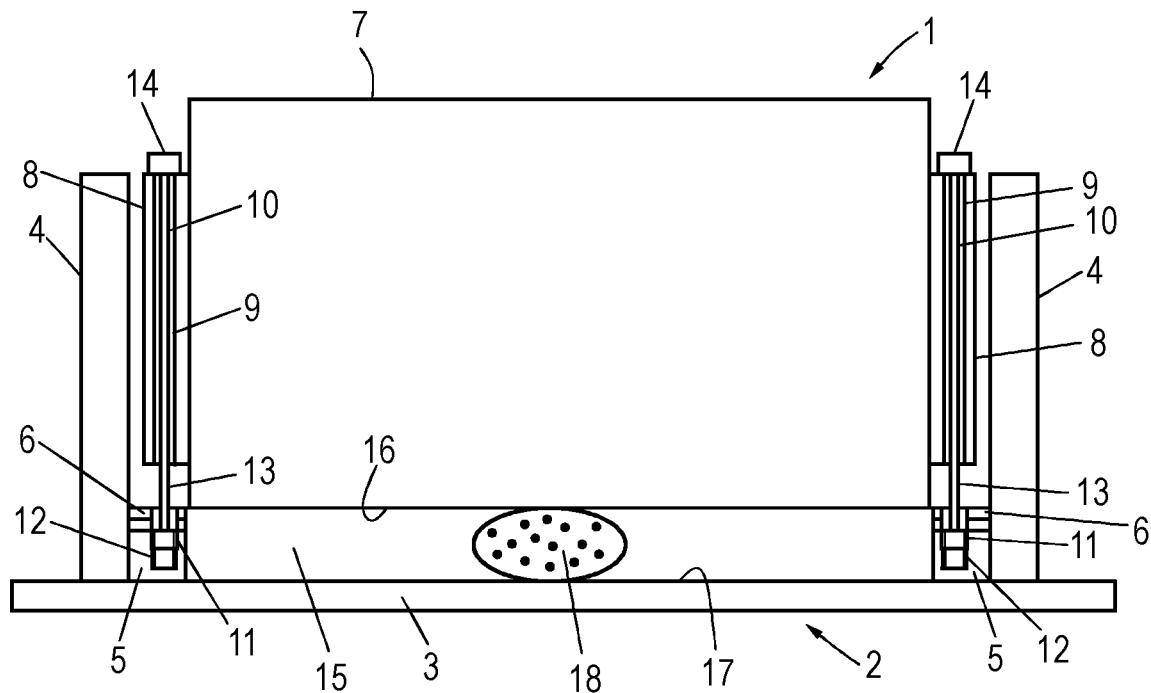

2022/0016965 A1* 1/2022 Schlesinger ........ H01M 50/262
2022/0181740 A1* 6/2022 Yamashiro .......... H01M 50/249

FOREIGN PATENT DOCUMENTS

| DE | 202011052036 U1 | 2/2013 | |
|----|----|----|----|
| DE | 102016222094 A1 * | 5/2018 | |
| DE | 102016222094 A1 | 5/2018 | |
| DE | 102019201077 A1 | 7/2020 | |
| EP | 2104121 A1 * | 9/2009 | .......... B60L 11/1874 |
| EP | 2104121 A1 | 9/2009 | |
| JP | 2004235481 A | 8/2004 | |
| RU | 2704568 C1 | 10/2019 | |

OTHER PUBLICATIONS

German Search Report dated Mar. 3, 2021 in corresponding German Application No. 10 2020 110 641.6; 12 pages; Machine translation attached.
Office Action dated Dec. 1, 2022, in corresponding Chinese Application No. 202110401583.9, 15 pages.

* cited by examiner

METHOD FOR CONNECTING AN ENERGY STORAGE MODULE TO A MODULE SUPPORT, IN PARTICULAR A COOLING ELEMENT

FIELD

The invention relates to method for connecting an energy storage module to a module support, in particular a cooling element, wherein the energy module is fastened on the module support by means of multiple connecting screws, which are each screwed into threaded bores provided on the module support, and wherein a gap is provided between the bottom of the energy storage module and the bottom of the module support, into which a thermally-conductive compound is introduced, which is distributed to fill the gap when the energy storage module is screwed on as a result of a reduction of the gap width.

BACKGROUND

Electrically-operated motor vehicles require one or more energy storage devices, also called batteries, which typically comprise a plurality of individual energy storage modules. These modules are fixedly connected to a module support, in particular a cooling element, via which cooling of the energy storage modules is possible. Introducing a thermally-conductive compound, typically pasty, into a gap existing between the bottom of the energy storage module and the bottom of the module support is known here, see, for example EP 2 104 121 A1, which is compressed upon tightening of the connecting screws because the gap width is reduced as they are screwed in. The compound, typically called "gap filler," is distributed in the entire gap space, so that thermal coupling is provided between the bottom of the energy storage module and the module support, in particular the cooling element. This type of fastening the energy storage module or modules is problematic insofar as cases of soft screws can occur during the tightening of the screws, i.e., the screw head can be screwed slightly into the soft surface, for example of the housing of the energy storage module. In this case, the rotational movement is braked, but not stopped, so that ultimately the torque increases less and thus a "soft" screw connection is provided. Setting equal tightening conditions over all screw connections is therefore not always possible, there are cases in which reworking is necessary. Furthermore, often only a relatively large gap can be set by this system.

In addition, using tolerance compensation elements in manufacturing at the factory of such an energy storage device is known, which elements are placed between the energy storage module and the module support and through which the respective connecting screw extends. Such a tolerance compensation element is a two-part component, comprising a first section fixed on the module support and a second section, which interacts with the connecting screw and is moved opposite to the screwing-in direction and presses against the energy storage module in the connected position. Placing such tolerance compensation elements enables the implementation of a minimal gap, wherein in this known method the thermally-conductive compound is not compressed via the screw connection, but via a press, which applies a force of approximately 10 kN for the compression. After the compression, the connecting screws are placed to finally fix the already compressed energy storage module, wherein the second section of the tolerance compensation element is unscrewed during the screwing in of the connecting screws and the connecting screw spins upon reaching the fastening end position.

Such a connecting technique can be selected at the factory, but not on location in the workshops, since a corresponding press is not available there. If an attempt is made using the typical connecting screws while using such tolerance compensation elements to screw down the energy storage module and simultaneously to compress the compound, this would thus not result in complete distribution of the compound, since the tolerance compensation elements would quasi-freeze the gap existing at the start of the screwing down, since the second section is unscrewed from the first during the screwing down as soon it presses against the bottom of the energy storage module, which would limit the further compression movement.

SUMMARY

The invention is therefore based on the object of specifying an improved method for connecting an energy storage module to a module support, in particular a cooling element, which can also be carried out in particular in a workshop.

To solve this problem, it is provided according to the invention in a method of the type mentioned at the outset that multiple tolerance compensation elements are provided between the energy storage module and the module support, which each have a first section fixed on the module support and a second section, which interacts with the connecting screw and is moved opposite to the screwing-in direction, and which presses against the energy storage module in the connected position, wherein first the energy storage module is screwed down using compression screws, which do not interact with the second sections, in such a way that the height of the gap is reduced and the compound is distributed to fill the gap, after which the compression screws are removed and the connecting screws are placed and screwed down, which interact with the second sections and the second sections are unscrewed from the first sections until the second section presses against the energy storage module.

In the method according to the invention, the compression of the compound is carried out by screwing in special compression screws, which are designed so that the energy storage module is moved toward the module support during the screwing down and the compound is also compressed, but at the same time no mechanical interaction takes place between the compression screws and the respective second sections of the tolerance compensation elements. That is to say, these compression screws are used exclusively for the initial screwing down of the energy storage module on the module support solely to compress the compound, but not for the final fixing of the energy storage module on the module support with activation of the tolerance compensation elements. The actual connecting screws are provided for this purpose, which are screwed down as replacements for the compression screws, and which, as quasi-typical connecting screws also heretofore used, have a corresponding threaded section which can be screwed into the module-support-side threaded bore, on the one hand, and which interacts with the second section, on the other hand, so that it is unscrewed and runs toward the module bottom.

The use of the specific compression screws therefore enables the required high forces to be applied on location in the workshop, which are necessary to move the energy storage module sufficiently forcefully against the module support and to compress the compound in this case, so that it is distributed in the gap while completely filling it without this movement or this compression having been obstructed by the tolerance compensation elements, since the tolerance compensation elements are not actuated.

To enable this, in one refinement of the invention each compression screw can have a threaded section, the length of which is dimensioned so that it can be screwed without problems into the module-support-side threaded bore. A shaft section having reduced diameter adjoins this threaded section. This reduced diameter is provided in particular in the region with which the shaft section extends through the tolerance compensation element. The reduced shaft diameter is dimensioned so that the compression screw does not interact with the second section of the tolerance compensation element, it thus remains unactuated, even when the compression screw is screwed in and tightened. For the compression, the compression screws are accordingly placed through corresponding passages in the housing of the energy storage module or a corresponding placed cover overlapping the energy storage module and positioned with respect to the module-support-side threaded bores. Upon the tightening of the compression screws, the screw heads run against the upper side of the energy storage module or the fastening cover so that with increasing screwing down, the energy storage module is pressed against the module support while compressing the compound. This screwing down takes place until it is ensured that the compound is completely compressed and distributed, which is provided, for example, when a required tightening torque is reached, so that a corresponding gap setting is defined via this, or by a gap filler compound escape on the module side or the like.

In the next step, the compression screws are loosened and the connecting screws, typical standard fastening screws, are inserted through the passages and screwed into the threaded bores. Minor further compression possibly also takes place here. In any case, however, the second sections of the tolerance compensation elements are actuated and unscrewed, thus run against the bottom of the energy storage module and thus clamp the tolerance compensation element between the module support and the energy storage module. Upon reaching this end position, each connecting screw spins, that is to say that the second section is not unscrewed further until the connecting screw has reached its end position. The module is fixed, but the compound is also completely distributed at the same time.

This method can obviously be carried out without problems at the workshop, since the use of the compression screws enables solid compression and the setting of a very small gap width, since the high required screwing force can be applied without the tolerance compensation element limiting the gap width.

As described, each tolerance compensation element interacts using the second section with the connecting screw. In order that this is possible, each tolerance compensation element expediently has a spring element interacting with the connecting screw in the second section, wherein the connecting screw, when the second section presses against the energy storage module, spins inside the spring element or is no longer in contact with the spring element. This spring element is accordingly a driver element which interacts temporarily with the connecting screw until it spins or is no longer in contact with the spring element.

To fasten each tolerance compensation element on the module support, the first section of each compensation element expediently has a threaded section, using which the first section is screwed into a threaded bore provided on the module support, and the second section assumes a predetermined position relative to the first section. That is to say, the tolerance compensation element is screwed in a simple manner into a module-support-side threaded bore and fixed therein. At the same time, the second section is set relative to the first section so that it assumes a defined position in relation thereto. The second section can be screwed with an externally threaded section into an internally threaded bore of the first section, so that it can be unscrewed via this screw connection during the screwing in of the connecting screw, for which purpose the thread ascends opposite to the screwing-in direction.

Any arbitrary module support can be used as the module support, but preferably a cooling element such as a corresponding cooling plate or the like, via which the dissipation of the heat arising during operation of the energy storage module takes place.

BRIEF DESCRIPTION

Figure 2:
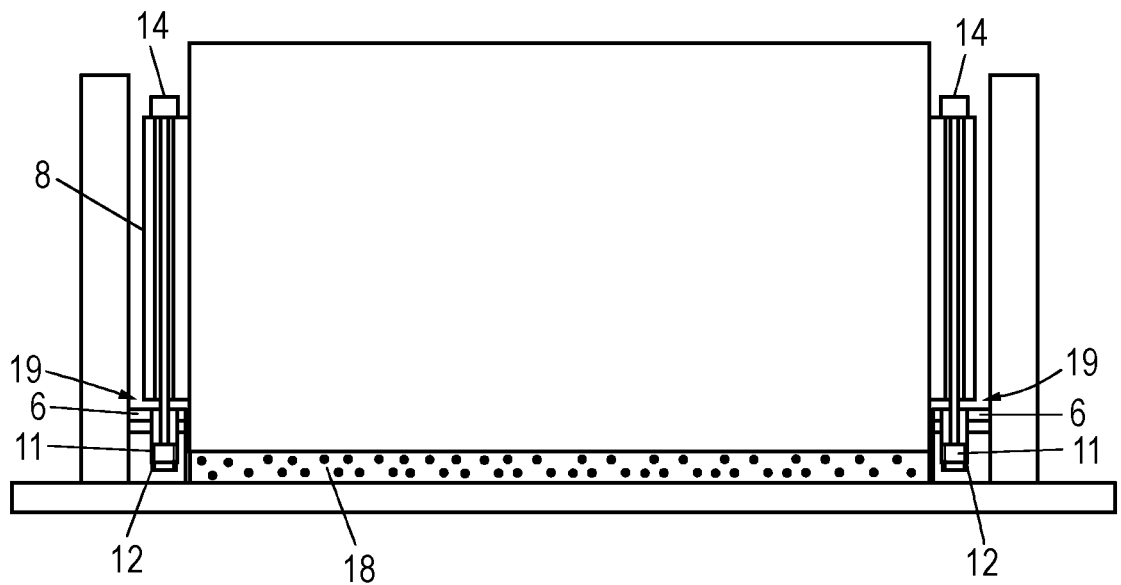
Figure 3:
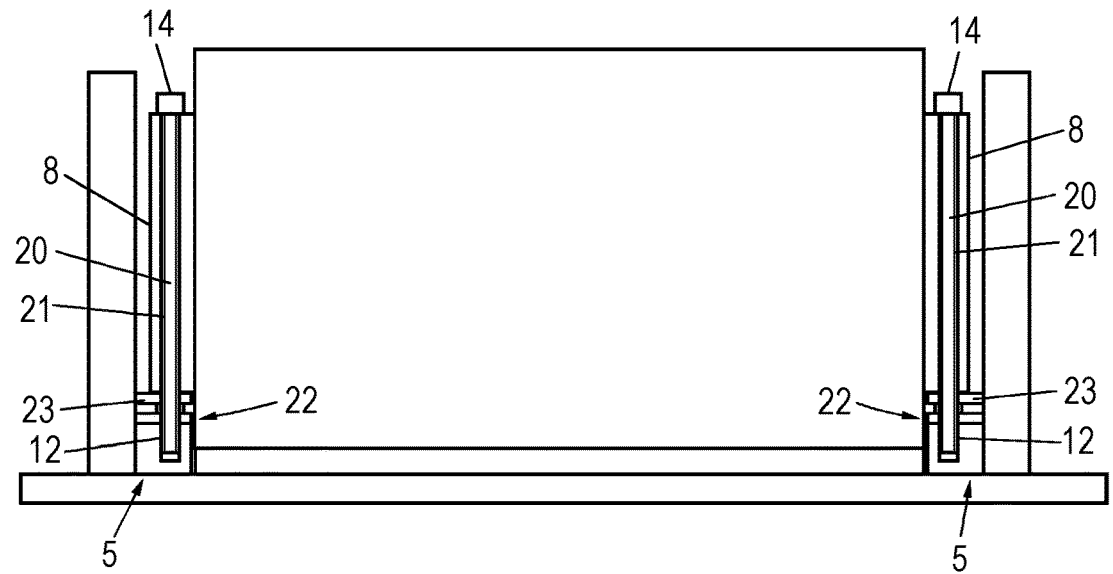
Figure 4:
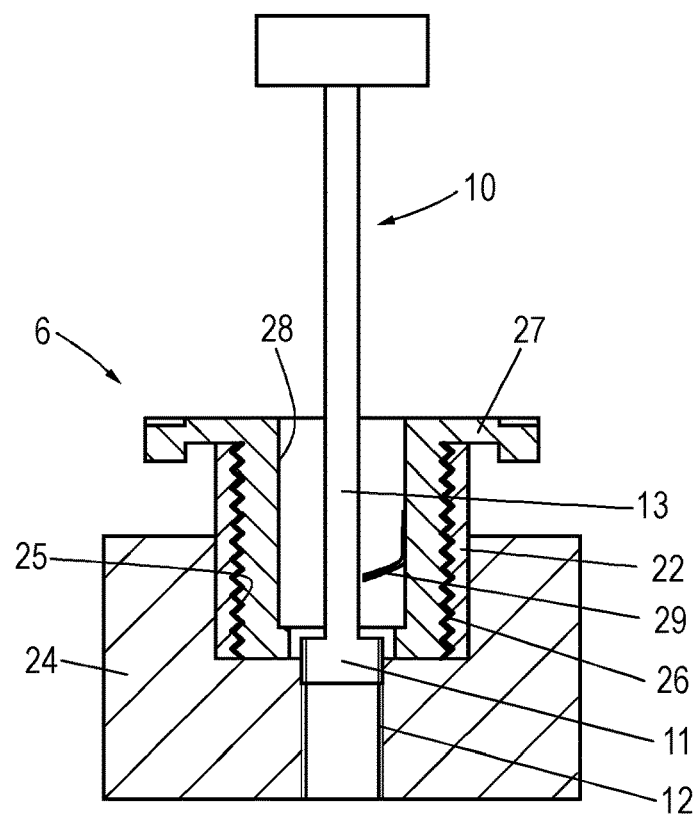
Figure 5:
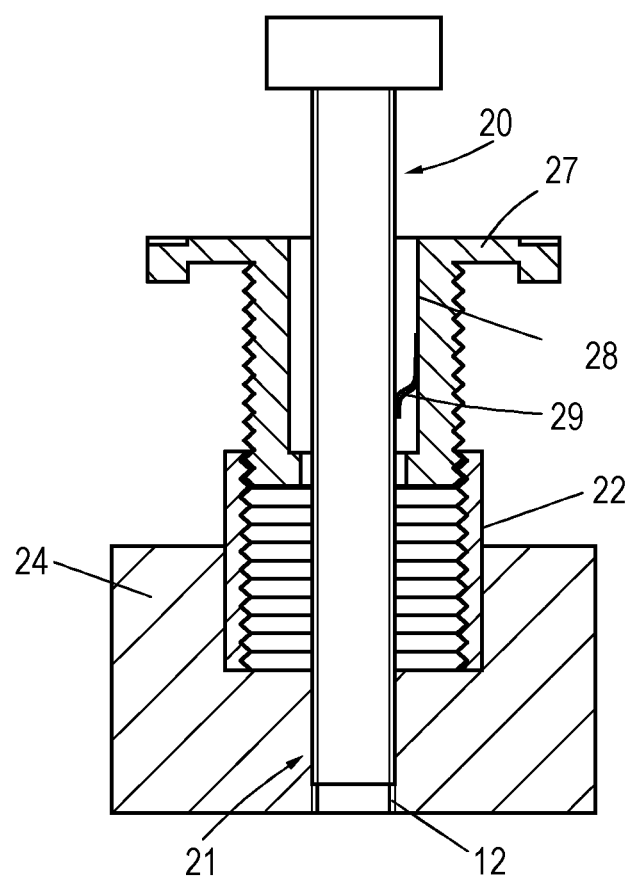

Further advantages and details of the present invention result from the exemplary embodiments described hereinafter and on the basis of the drawings. In the figures:

FIG. 1 shows a schematic illustration of an energy storage module placed on the module support before the compression using the compression screws, FIG. 2 shows the arrangement from FIG. 1 after the compression using the compression screws, FIG. 3 shows the arrangement from FIG. 2 after the replacement of the compression screws with the connecting screws, FIG. 4 shows a schematic illustration of a tolerance compensation element and the compression screw during the screwing down thereof, and FIG. 5 shows a schematic illustration of the tolerance compensation element and the connecting screw after the screwing down thereof.

DETAILED DESCRIPTION

FIG. 1 shows an energy storage module 1 and a module support 2, for example a cooling plate 3, which has two side walls 4 and two wall sections 5, on which multiple compensation elements 6, two of which are shown here, which are also described in detail hereinafter, are arranged. Each tolerance compensation element 6 has a first section, which is screwed in on the respective wall section 5, for example into a suitable threaded bore, and fixed therein. Furthermore, each tolerance compensation element 6 has a second section, which can be screwed down via a threaded connection relative to the first section and is unscrewed from the first section upon the placement of a connecting screw.

The energy storage module 2 itself has a housing 7, on which two housing sections 8 are provided in the example shown, which have a corresponding passage 9, through each of which a compression screw 10 is guided in the example shown. This compression screw 10 has in each case a threaded section 11 formed on one end, which is screwed into a threaded bore 12 on the wall section 5. This threaded section 11 is adjoined by a shaft section 13 having reduced diameter, as clearly shown in FIG. 1. This shaft section is located in the region with which the compression screw 10 extends in each case through the tolerance compensation element 6. In the example shown, this reduced shaft section diameter is maintained up to the screw head 14.

Furthermore, a gap 15 is obviously formed between the bottom 16 of the housing 7 of the energy storage module and the bottom 17 of the module support 2 or the cooling element 3. A bead of a thermally-conductive compound 18 is introduced into this gap, which is to be compressed so that it is distributed in the gap.

This takes place in that the compression screw 10 are tightened. This procedure is shown in FIG. 2. The compression screws 10 are screwed via the threaded sections 11 into the threaded bores 12 so that the screw heads 14, which press against the upper side of the housing sections 8, move the energy storage module 1 toward the module support 2. A significant reduction of the width of the gap 15 and a compression of the compound 18 take place here, as shown in FIG. 2.

FIG. 2 furthermore shows that the two tolerance compensation elements 6 remain completely unactuated in this case, that is to say, the second section of the tolerance compensation element 16 is not moved relative to the first section. In the installation position, a narrow gap 19 remains between the tolerance compensation element 6 and the respective wall section 8.

In the next step, which is shown in FIG. 3, the compression screws 10 are removed again and connecting screws 20 are screwed in. These connecting screws 20 have a continuous threaded section 21, i.e., a threaded shaft which is screwed into the threaded bore 12, on the one hand, and which interacts with the second section because of its diameter, on the other hand, so that this second section is unscrewed from the first section until it comes into contact on the lower side of the respective wall section. This situation is shown in FIG. 3, where, on the one hand, the respective first section 22 of the tolerance compensation element is shown, which remains unmoving in its screwed-down position on the wall section 5, while the second section 23, viewed axially, is unscrewed from the first section 22.

During the unscrewing, the second section 23 runs against the housing section 8, which has the result that the threaded section 21, which has interacted up to this point with the second section, because of which the second section 23 was unscrewed from the first section 22, now rotates through the second section, and as a result the second connecting screw 20 can still be screwed in somewhat further until the installation end position is just reached, which can be ascertained, for example, by detecting a corresponding tightening torque.

FIG. 4 shows a more detailed view of a tolerance compensation element 6 with its first section 22 and its second section 23. The first section 22 is inserted, for example screwed, into a receptacle 24 formed on the module support 2. The threaded bore 12 is formed in extension of this receptacle 24, into which the threaded section 11 of the compression screw 10 and also the threaded section 21 of the connecting screw 20 is screwed.

Furthermore, the internally threaded bore 25 of the first section 22 and the externally threaded section 26 of the second section 23 are shown, that is to say, the two can be screwed together relative to one another. The second section 23 has a terminal radial shoulder 27, with which it presses against the lower side of the respective housing section 8 in the installation final position.

A spring element 29 is received in a through bore 28 of the second section 23, which is capable of interacting with the threaded section 21 when the connecting screw 20 is screwed in. As described, the second section 23 is carried along against the screwing-in direction here, that is to say, the second section 23 is unscrewed from the first section 22, as will be described hereinafter.

In the embodiment according to FIG. 4, the compression screw 10 is screwed in. The threaded section 11 obviously engages in the internally threaded bore 12, screwing down and thus tightening of the energy storage module 1 toward the module support 2 is thus possible. However, the shaft section 13 reduced in diameter obviously does not interact with the spring element 29, so that the second section 23 is not moved independently of how deep the connecting screw 10 is also screwed in.

The situation is different according to FIG. 5, where the connecting screw 20 is screwed in. It is inserted and screwed with the threaded section 21 into the threaded bore 12. However, during this screwing down movement, an interaction simultaneously takes place between the threaded section 21 and the spring element 29, so that the second section 23 is moved and, due to the thread pitch of the threaded connection between the first and the second section 22, 23, is unscrewed from the first section 22 against the screwing-in direction, as FIG. 5 clearly shows. This takes place until the radial flange 27 presses against the lower side of the respective wall section 8. The second connecting screw 20 or the threaded section 21 then spins, that is to say, the clamping action in relation to the spring element 29 is no longer provided and the connecting screw 20 can be finally tightened.

The fastening system according to the invention obviously enables, on the one hand, the energy storage module 1 to be screwed down toward the module support 2 solely by a screw connection, namely by using the compression screws, with sufficiently high force, so that the compound 18 can be compressed and a very narrow gap width can be achieved. At the same time, by replacing the compression screws with the connecting screws, the fastening system subsequently enables the placed tolerance compensation elements, which have been unactuated up to this point, to be actuated and to be quasi-clamped between the respective wall section 5 in the housing section 8, so that possible residual gaps are also compensated here.

The invention claimed is:

1. An apparatus comprising:
   an energy storage module;
   a module support, wherein the energy storage module is configured to be fastened on the module support by multiple connecting screws, which are each screwed into threaded bores provided on the module support, wherein a gap is provided between a bottom of the energy storage module and a bottom of the module support, into which gap a thermally-conductive compound is introduce which is distributed to fill the gap due to a reduction of a gap width when the energy storage module is screwed down;
   multiple tolerance compensation elements, provided between the energy storage module and the module support, wherein each tolerance compensation element has a first section fixed on the module support and a second section coaxial with the first section and is configured to interact with each respective connecting screw, move against a screwing-in direction, and presses against the energy storage module in a connected position, wherein multiple compression screws are configured to not interact with the second sections and interact with the first sections, in such a way that the gap width is reduced and the compound is distributed to fill the gap, after which the first compression screws are removed, wherein the multiple connecting screws which, as replacements for the multiple compression screws, are configured to interact with the respective second sections so that the respective second sections are unscrewed from the respective first sections until the respective second sections are configured to press against the energy storage module.

2. The apparatus of claim 1, wherein the compression screws further comprise:
a threaded section configured to be screwed into the threaded bore and a shaft section adjoining thereon and reduced in diameter in such a way that the shaft section does not interact with the respective second sections of the multiple tolerance compensation elements.

3. The apparatus of to claim 1, wherein each tolerance compensation element further comprises:
a spring element configured to interact with the threaded section of a second connecting screw, wherein the second connecting screw, when the second section presses against the energy storage module, spins inside the spring element or is no longer in contact.

4. The apparatus of claim 1, wherein the first section of each tolerance compensation element is screwed with a threaded section into a threaded bore provided on the module support and the second section assumes a predetermined position relative to the first section.

5. The apparatus of claim 1, wherein a cooling element is used as the module support.

6. The apparatus of claim 2, wherein each tolerance compensation element further comprises:
a spring element configured to interacting with the threaded section of the second connecting screw, wherein the second connecting screw, when the second section presses against the energy storage module, spins inside the spring element or is no longer in contact.

7. The apparatus of claim 2, wherein the first section of each tolerance compensation element is screwed with a threaded section into a threaded bore provided on the module support and the second section assumes a predetermined position relative to the first section.

8. The apparatus of claim 3, wherein the first section of each tolerance compensation element is screwed with a threaded section into a threaded bore provided on the module support and the second section assumes a predetermined position relative to the first section.

9. The apparatus of claim 2, wherein a cooling element is used as the module support.

10. The apparatus of claim 3, wherein a cooling element is used as the module support.

11. The apparatus of claim 4, wherein a cooling element is used as the module support.

* * * * *